Figure 1:
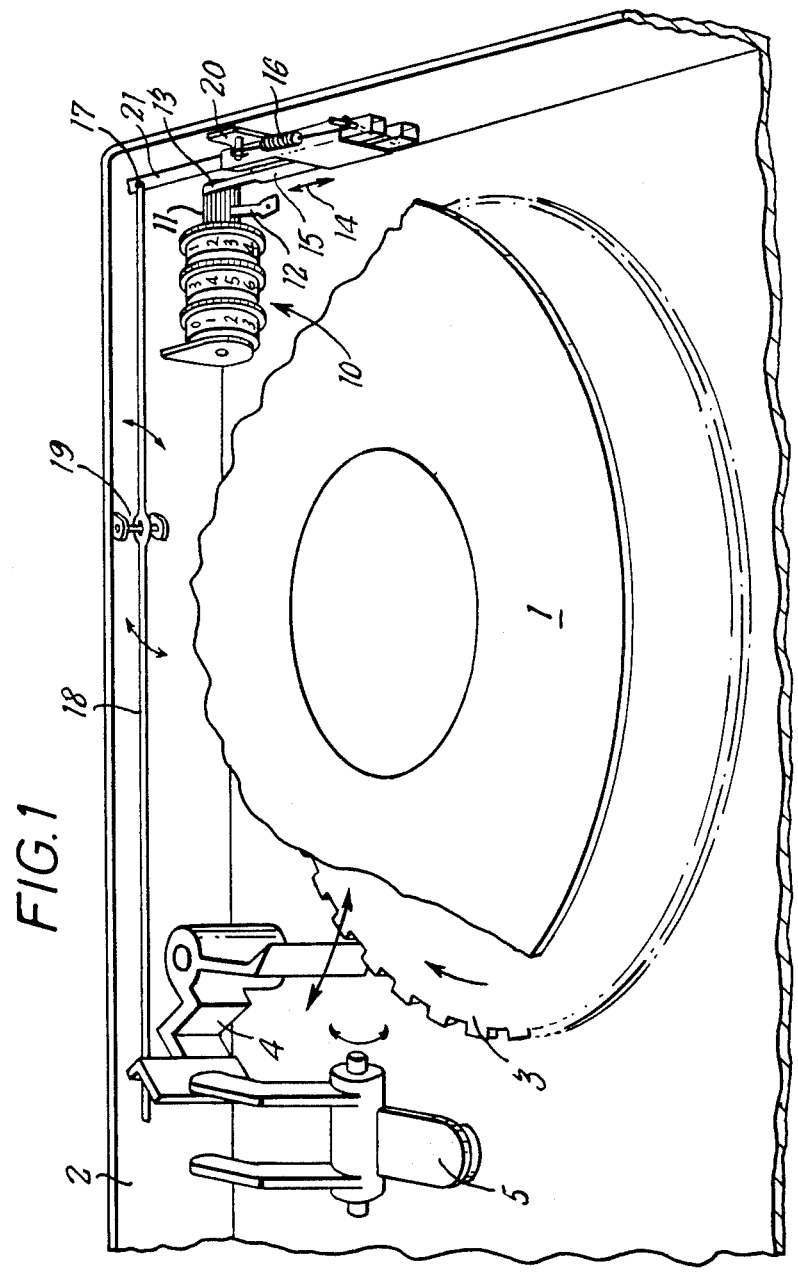

United States Patent [19]

Lambert et al.

[11] Patent Number: 4,554,443
[45] Date of Patent: Nov. 19, 1985

[54] TAPE CASSETTES

[76] Inventors: Harry Lambert; Margaret C. Lambert, both of Carriage Pl. 77500 Interstate 10, Indio, Calif. 92201

[21] Appl. No.: 495,472

[22] Filed: May 17, 1983

[30] Foreign Application Priority Data

May 25, 1982 [GB] United Kingdom ............... 8215181

[51] Int. Cl.$^4$ ............................................. G04B 37/00
[52] U.S. Cl. .................................. 235/103; 235/1 D; 235/130 R; 235/135
[58] Field of Search ....... 235/1 D, 1 C, 103, 103.5 R, 235/104, 135, 142, 144 PN, 117, 130 R

[56] References Cited

U.S. PATENT DOCUMENTS

| | | | |
|---|---|---|---|
| 2,756,279 | 7/1956 | Lang | 235/103 X |
| 2,944,750 | 7/1960 | Hall, Jr. | 235/103 X |
| 3,604,624 | 9/1971 | Miura et al. | 235/103 |
| 4,274,605 | 6/1981 | Gruber, Jr. | 235/103 X |

FOREIGN PATENT DOCUMENTS

WO83/02105 6/1983 PCT Int'l Appl. ................. 235/103

Primary Examiner—Benjamin R. Fuller
Attorney, Agent, or Firm—Darby & Darby

[57] ABSTRACT

Tape cassettes, particularly video tape cassettes, are provided with means internally to count the number of times the cassette is subjected to a sequence of user operations. This enables a hirer of such cassettes to see how many times the cassette has been used and to charge a hire fee accordingly. The counter may be mechanical, electro-mechanical or electronic, and is actuated by means associated with the tape release mechanism already built into such cassettes as a standard component; thus, no modification to of extra interaction with, the cassette player is needed.

4 Claims, 2 Drawing Figures

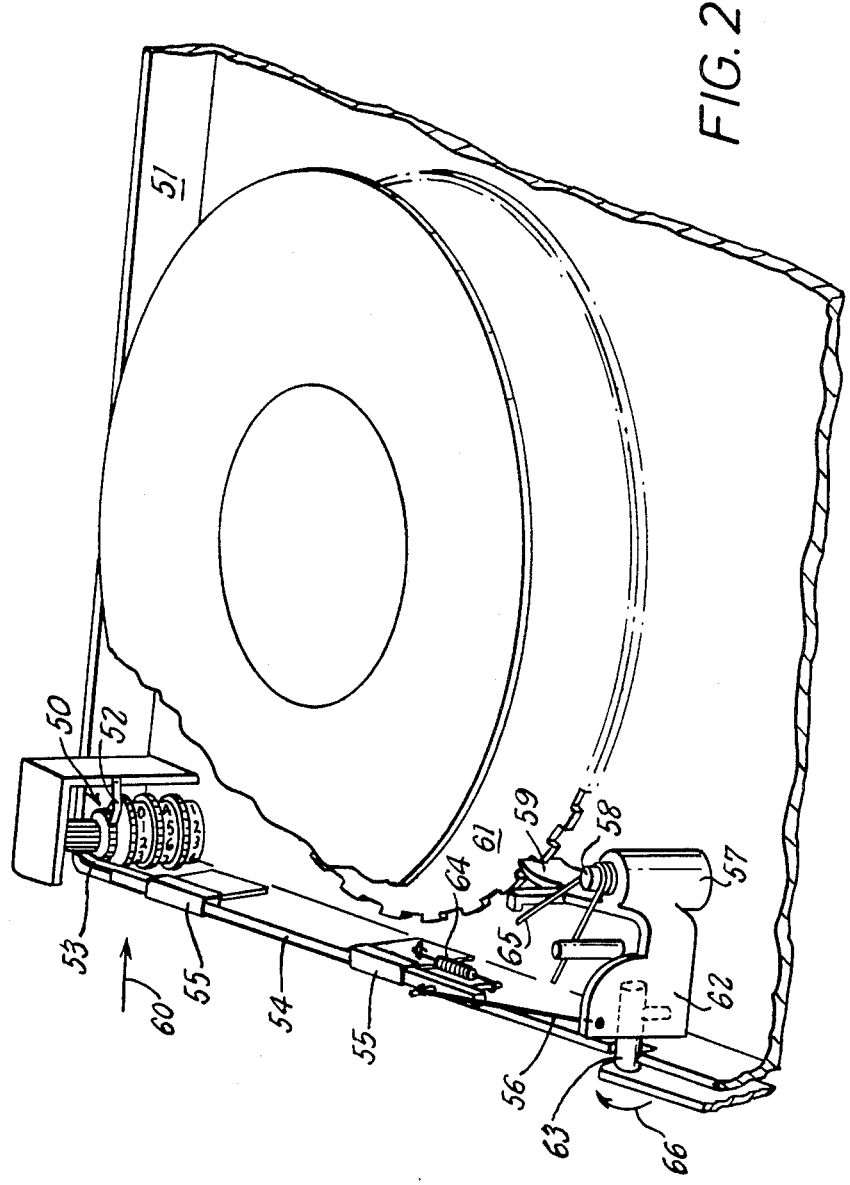

TAPE CASSETTES

FIELD OF THE INVENTION

This invention relates to tape cassettes.

BACKGROUND OF THE INVENTION

In recent years widespread use has been made of recording materials in the form of magnetic tape. Magnetic tape is conveniently handled on reels and in order to minimise damage to the tape from improper handling various so-called cassette formats have been developed. These consist generally of a pair of reels housed in a suitable casing in side by side relationship, the casing including appropriate guide means to guide tape from one reel through a path in the casing to the other reel. The casing is appropriately configured so that when the cassette is placed in tape recording or reproduction apparatus for recording or play, appropriate recording and erase heads are brought to lie adjacent the tape path and accordingly can interact with the magnetic coating on the tape.

One area of substantial growth in recent years in connection with tape cassettes has been the so-called video cassette. While a number of cassette formats have been developed, two have become pre-eminent and are known by the respective trade marks of BETAMAX and V.H.S. In both cases the cassette is adapted to be placed into a video cassette recorder/player apparatus which is connected to a normal domestic television receiver to display the recording. A major industry has emerged over the last few years connected with the supply of pre-recorded video material on such cassettes.

The fundamental sector of the pre-recorded video cassette industry comprises the owners of the copyright of the original feature films.

The manufacture, distribution and sale of prerecorded cassettes may be undertaken by the copyright owners themselves or they may license others to undertake any or all of the operations for them. Whatever the variations the owners of the copyright are entitled to be rewarded when their copyrighted material is viewed.

From the production of an original feature film to the completed pre-recorded cassette is an expensive process which is reflected in their relatively high price. This constitutes a barrier to sales, particularly where, in contrast to, for example, phonograms, the average consumer will not want to view the material a very large number of times. The tape medium itself is of course adapted for viewing a very large number of times without noticeable deterioration of the quality of the reproduced image. From this commercial situation has emerged an increasing practice of hiring out of video cassettes rather than their direct sale.

This has led to the proliferation of renters who purchase pre-recorded cassettes of feature films and then hire them out to their customers for an agreed rental fee for a specified period of time, e.g. 24 hours. There are many variations of this basic practice. This means that when the renter purchases the cassette each of the elements from the copyright owner to the distributor receive a share of the purchase price. Thereafter they receive nothing additional although the renter may hire the cassette to a hundred customers or more.

Each time a cassette programme is viewed its value to the copyright owner is depreciated because in most instances the viewers would not wish to see it again so its potential value has thereby been reduced by this proportion.

In order that the copyright owners can be more fairly reimbursed, it is desirable to count the number of times a cassette is used. Clearly, when a cassette is hired out, the owner cannot know how many times it is used by the hirer. Proposals have been made, accordingly, for counters in cassettes. British Patent Specifications Nos. 1284020, 1312085 and 1448375 show such proposals, but none has achieved commercial success, since they rely on an interaction between cassette and playing apparatus requiring a modification of the latter or have means such as an arm bearing on the tape itself, which would rapidly lead to tape degradation.

OBJECT OF THE INVENTION

It is an object of the invention to provide a tape cassette of the type referred to which carries means for counting, which can be used without requiring any special modification to or interaction with the playing apparatus, and which has no adverse effect on the performance of the cassette or the tape in it.

GENERAL STATEMENT OF THE INVENTION

According to the present invention there is provided a tape cassette including a casing, a tape storage spool and a tape take up spool, means for locking at least one of the spools in position when the cassette is not inserted in a cassette player, and means located within the casing and mechanically linked to said locking means, and adapted to count each time the cassette is subjected to a predetermined sequence of operations and to display the count.

In accordance with the invention, the movement of the tape release mechanism internally of the cassette, which has to occur irrespective of the type or model of playing apparatus into which the cassette is inserted, is used to advance a counter, preferably a cyclometer counter. Most conveniently, release of the tape causes a spring to be loaded and re-locking of the tape causes release of the spring loading to advance the counter. This advancement of the counter enables someone hiring out e.g. video cassettes to determine, by noting the count when the cassette was hired and the count when it was returned, how many times the cassette had been inserted into and removed from a cassette player, and charge the customer accordingly.

A very wide variety of count mechanisms may be used. For example simple mechanical count systems may be incorporated inside the cassette casing having mechanical actuation means which are actuated e.g. on insertion of the cassette into recording/reproduction apparatus, and/or its removal therefrom. The counter may be a simple mechanical counter such as a cyclometer. Alternatively, the cassette may incorporate for example a wholly electronic system powered by a miniature cell located within the casing or by generator means associated with the turning of the tape spools in use. Such electronic apparatus may include one or more sensors which may be adapted to sense for example when the cassette is placed in recording apparatus and/or when the tape is driven in forward or reverse directions and may include logic circuitry, optionally reprogrammable logic circuitry, determining what sequence of operations causes the count to increase by one, and finally including a suitable display for displaying the count. A suitable display system is a liquid crystal display of the type used in digital watches.

Other ways of providing mechanical, electromechanical or electronic counting systems within a cassette casing will occur to those skilled in the art.

SPECIFIC DESCRIPTION OF THE DRAWINGS

By way of illustration, the accompanying drawings show two mechanical systems incorporated in two cassettes. In the drawings:

FIG. 1 is a perspective view of one corner of a broken open standard V.C.R. cassette showing a mechanical cyclometer counter system installed therein, and FIG. 2 is a diagram analogous to FIG. 1 of a BETAMAX cassette.

Referring to FIG. 1 this shows generally parts of a standard V.C.R. cassette with the top removed. The following standard parts are shown in the drawing:

Tape storage spool: 1
Outer plastics casing: 2
Serrated edged spool bottom flange: 3
Spool brake lever: 4
Brake actuation lever: 5

Various parts of the cassette have been omitted from the drawing for the sake of clarity. Normally when the cassette is supplied the spool 1 is full of magnetic tape and the positions of members 4 and 5 are as shown in the diagram. When the cassette is inserted into the cassette player the brake actuation lever 5 is rotated about a horizontal axis as shown by the arrows and this causes brake lever 4 to rotate clockwise as seen in the drawing about a vertical axis, thus removing the edge of brake lever 4 from the serrations at the edge of flange 3. This then allows spool 1 to turn and accordingly allows tape to be removed from the storage spool and wound on to the take up spool during viewing of the pre-recorded material.

In accordance with the invention a counter mechanism has been installed to determine how many times the cassette is inserted into and removed from a V.C.R. player.

The counter mechanism illustrated consists basically of a standard set of cyclometer wheels 10 mounted on the floor of the casing. The count is visible through a window in the top of the casing (not illustrated). The set of wheels 10 is turned by means of a toothed spindle 11 which is in the form of a rotary ratchet. A fixed pawl 12 engaging the ratchet is mounted on the base of the cassette while a movable pawl 13 also engages the ratchet as shown. Movable pawl 13 may be moved to and fro in the direction of arrows 14 together with a spring loaded pair of rods 15, 21 to rod 15 of which it is rigidly affixed. Rods 15 and 21 are spring loaded by a tension spring 16 attached to the casing at 20. The end of rod 21 opposite its end attached to spring 16 is pivoted at 17 to an actuation lever 18 which is itself mounted for rotation about a vertical axis on a spigot 19 located on the base of the casing 2. The end of lever 18 remote from pivot point 17 lies adjacent part of brake lever 4.

In operation the cassette illustrated works as follows:

When supplied to the person wishing to play the cassette, the components are in the position shown in the drawing. When the cassette is inserted into the cassette player, levers 5 and 4 are actuated and the spool brake released. At the same time, the rotation of lever 4 causes lever 18 to rotate about pivot 19 and thus push rods 15 and 21 away from the wheels 10, extending spring 16. At the same time the end of spring pawl 13 moves across the top of one tooth of the rotary ratchet 11. The cassette, now in the video cassette player, may now be played and rewound one or more times. However, when it is finally removed from the player, the removal of the cassette causes brake lever 4 to re-engage flange 3 and allows spring 16 to push rods 15 and 21 back to their initial position, at the same time causing spring pawl 13 to rotate the end cylcometer wheel by one unit, thus increasing the visible count.

Thus, a customer hiring a tape cassette as just described would in effect be hiring the right to view the pre-recorded film just as is done when paying admission to a cinema. When the programme has been seen the cassette may be removed from the V.C.R., whereon the counting device records the transaction by adding one unit. By recording the number of times the cassette has been used in this way an accounting can be made to the copyright owner and distribution organization so that a share of the hiring fees received by the renter can be allocated to them.

This simple sequence of operations normally gives adequate flexibility. Should the viewer wish to interrupt the cassette, e.g. to watch something else on real time television he may do so by stopping the V.C.R., and return to it later to see the remainder of the programme on the cassette.

FIG. 2 shows a system which works in the same way for a BETAMAX cassette. In this case, a cyclometer counter 50 is mounted in one corner of the cassette casing 51. The count can be seen via a window in the side of the cassette casing, looking in the direction of arrow 60.

The cyclometer drive is again via a ratchet wheel co-operating with fixed and movable pawls 52, 53 respectively. Pawl 53 is mounted on one end of a rod 54 which slides in two guides 55 fixed on the wall of casing 51. The end of rod 54 is linked by a flexible tie 56 to one side of a spool brake lever 57, which lever is rotatably mounted on a vertical post 58, and biased in a clockwise direction, as seen in the drawing, by a sear spring 65. Lever 57 has an arm 59 which engages the serrated edge of a tape spool 61, and an arm 62 to which tie 56 is attached. Lying behind arm 62, as shown in FIG. 2, is an actuation rod 63 which has a lateral boss. When rod 63 is rotated about its horizontal axis, this boss engages arm 62 and rotates lever 57 anti-clockwise as seen in the drawing. Rod 63 forms part of the tape protection cover of the cassette (not shown in the drawing) and such rotation in the direction of arrow 66 occurs each time the cassette is loaded into a BETAMAX player. A spiral spring 64 is engaged between one mounting 55 and rod 54 and urges rod 54 towards the cyclometer unit 50.

When the cassette is loaded into a BETAMAX player, rod 54 is pulled back as the tape cover is rotated, and pawl 53 moves across one tooth of the ratchet. When the cassette is removed from the player, the protective cover rotates back, lever 57 rotates clockwise, and spring 64 pushes pawl 53 to rotate the ratchet by one tooth and thus increase the count visible on the set of cyclometer wheels by one unit.

I claim:

1. A magnetic tape cassette including a casing, a tape storage spool and a tape take-up spool, means in the casing for interacting with a cassette player, said interacting means including means for undergoing mechanical motion when said cassette is inserted into or withdrawn from said cassette player, means for locking at least one of said spools in position when said cassette is not inserted in said cassette player and means located within said casing and mechanically linked to said interacting means and to said locking means for counting each time said cassette is subjected to a predetermined sequence of operations, said counting means including a set of cyclometer wheels for displaying a count, said casing including a window through which said counting on said wheels is visible, said counting means further including spring means set by movement of said locking means when said cassette is inserted into reproduction equipment and released to move a cyclometer wheel corresponding to the last significant digit by one unit when said cassette is removed from said cassette player.

2. The cassette of claim 1 wherein a pawl and ratchet means is associated with the set of cyclometer wheels, and the spring means comprises a spring loaded bar deflectable on insertion of the cassette into a cassette player and arranged during such movement to move the pawl across one tooth of the ratchet, and on removal of the cassette from the cassette player to cause the pawl to move the ratchet a distance substantially corresponding to moving the cyclometer wheel one unit.

3. In a magnetic tape cassette of the type including a casing, a tape storage spool and a tape take-up spool, the improvement comprising:

means for locking at least one of the spools against rotation when the cassette is not inserted in a cassette player and means located within the casing and mechanically linked to said locking means for counting each time the cassette is subjected to a predetermined sequence of operations, the sequence including at least one of inserting the cassette into the cassette player and removing the cassette from the cassette player.

4. The cassette of claim 3 wherein the counting means includes a set of cyclometer wheels and wherein the casing includes a window through which the count on the wheels is visible.

* * * * *